United States Patent
Jung

(10) Patent No.: US 6,411,060 B1
(45) Date of Patent: Jun. 25, 2002

(54) DRIVING DEVICE FOR SWITCHED RELUCTANCE MOTOR AND METHOD THEREFOR

(75) Inventor: Yun Chul Jung, Kwangmung (KR)

(73) Assignee: LG Electronics Inc. (KR)

(*) Notice: Subject to any disclaimer, the term of this patent is extended or adjusted under 35 U.S.C. 154(b) by 0 days.

(21) Appl. No.: 09/503,702

(22) Filed: Feb. 14, 2000

(30) Foreign Application Priority Data

Jun. 4, 1999 (KR) ............................................. 99/20663

(51) Int. Cl.[7] ................................................. H02P 1/46
(52) U.S. Cl. ........................................ 318/701; 318/254
(58) Field of Search ................................. 318/254, 139, 318/701

(56) References Cited

U.S. PATENT DOCUMENTS

| | | | | |
|---|---|---|---|---|
| 4,739,240 A | * | 4/1988 | MacMinn et al. | 318/696 |
| 4,896,088 A | * | 1/1990 | Jahns | 318/696 |
| 5,532,567 A | * | 7/1996 | Iwasaki et al. | 318/701 |
| 5,563,488 A | * | 10/1996 | Stephenson et al. | 318/701 |
| 5,637,972 A | * | 6/1997 | Randall et al. | 318/616 |
| 5,652,493 A | * | 7/1997 | Hendershot, Jr. | 318/701 |
| 5,652,494 A | * | 7/1997 | Sugden | 318/701 |
| 5,737,164 A | * | 4/1998 | Ferreira et al. | 361/31 |
| 5,866,962 A | * | 2/1999 | Kim | 310/68 B |
| 6,011,377 A | * | 1/2000 | Heglund et al. | 318/701 |
| 6,091,170 A | * | 7/2000 | Mayes et al. | 310/68 B |

FOREIGN PATENT DOCUMENTS

| | | |
|---|---|---|
| JP | 08237982 | 9/1996 |
| JP | 10313588 | 11/1998 |
| JP | 10337073 | 12/1998 |
| JP | 11113276 | 4/1999 |
| JP | 11113283 | 4/1999 |

OTHER PUBLICATIONS

English translation of Abstract of Japanese Patent Application No. 11113283 dated Apr. 23, 1999.

* cited by examiner

Primary Examiner—Robert E. Nappi
Assistant Examiner—Rina I. Duda
(74) Attorney, Agent, or Firm—Ostrolenk, Faber, Gerb & Soffen, LLP

(57) ABSTRACT

The present invention relates to a driving of a switched reluctance motor, and in particular to a driving device for an SR motor which can detect a position of a rotor of the SR motor by using a smaller number of sensors than phases, and which can drive the SR motor on the basis of the detected result. At an initial stage of the starting of the SR motor, the position detection is not performed, and a microprocessor sequentially outputs a plurality of control signals, thereby aligning the rotor. After the starting, the microprocessor sequentially outputs the plurality of control signals according to a result detected from a position detection unit.

9 Claims, 8 Drawing Sheets

DRIVING DEVICE FOR SWITCHED RELUCTANCE MOTOR AND METHOD THEREFOR

BACKGROUND OF THE INVENTION

1. Field of the Invention

The present invention relates to a driving of a switched reluctance motor (hereinafter, referred to as 'SR motor'), and in particular to a driving device for an SR motor which can detect a position of a rotor of the SR motor by using a smaller number of sensors than phases, and which can drive the SR motor on the basis of the detected result.

2. Description of the Background Art

In order to exactly drive the SR motor, it is necessary to detect a position of a rotor of the SR motor. For this, sensors as many as phases are required. A speed of the rotor can be controlled by driving the rotor according to a result detected from the sensors.

For convenience' sake, a three phase SR motor will now be exemplified. FIG. 1 is a circuit diagram illustrating a driving device of a conventional SR motor. Reference numeral 10 denotes a microprocessor, 20 denotes a switching mode power supply (hereinafter, referred to as 'SMPS'), 30 denotes a driving circuit, and 40 denotes a position detection unit. The driving circuit 30 includes first to third driving units 31, 32, 33. The first to third driving units 31, 32, 33 apply a current respectively to an A phase winding La, a B phase winding Lb and a C phase winding Lc of a stator of the motor. The position detection unit 40 includes first to third photo sensors Sa, Sb, Sc detecting a position of each phase of the rotor, and three switching transistors Q7, Q8, Q9 corresponding to the operation of the three photo sensors Sa, Sb, Sc, and outputting a predetermined voltage (5V) to the first to third driving units 31, 32, 33 of the driving circuit 30, respectively. On the other hand, a sensor disc with a slot (not shown) is inserted into the SR motor for the operation of the photo sensors Sa, Sb, Sc.

The operation of the conventional driving device for the SR motor will now be described.

The microprocessor 10 outputs a control signal to the SMPS 20. The SMPS 20 outputs a direct current voltage having a predetermined level to the driving circuit 30 according to the control signal. The direct current voltage is converted by a capacitor C1 and a resistance R1, and applied to the first to third driving units 31, 32, 33. In this state, when the position of the rotor is detected by the position detection unit 40, one of the first to third driving units 31, 32, 33 is operated according to the detected result. Accordingly, the current is applied to the A phase, B phase or C phase winding of the stator, thereby rotating the rotor.

For example, when the first photo sensor Sa is turned on, the switching transistor Q7 is turned on. Thus, a voltage of 5V is applied to a lower switching transistor Q4 of the first driving unit 31. Accordingly, the lower switching transistor Q4 is turned on, and an upper switching transistor Q1 is also turned on, thus forming a current path consisting of the upper transistor Q1, the A phase winding of the rotor and the lower switching transistor Q4. The direct current voltage from the SMPS 20 is applied to the A phase winding La, and thus the rotor is rotated. When the rotor is rotated by a predetermined angle, the first photo sensor Sa is turned off, and the second photo sensor Sb is turned on. The switching transistor Q8 is turned on by the On state of the second photo sensor Sb, and thus a lower switching transistor Q5 and an upper switching transistor Q2 of the second driving unit 32 are sequentially turned on. Accordingly, the direct current voltage from the SMPS 20 is applied to the B phase winding Lb of the stator, and thus the rotor is constantly rotated. On the other hand, a magnetic flux generated to the A phase winding La is removed by two free wheeling diodes D1, D2 of the first driving unit 31, thereby smoothly rotating the rotor.

The above-described position detection and driving steps are repeatedly performed, and thus the rotor is constantly rotated. On the other hand, in order to vary a rotation speed of the motor, the SMPS 20 may vary a level of the direct current voltage according to the control signal from the microprocessor 10. The rotation speed of the rotor is varied according to the level of the direct current voltage.

However, the conventional driving device for the SR motor requires the position detection sensors such as the photo sensors as many as the phases in order to detect the position of each phase of the rotor. The position detection sensors are high priced. In addition, added is a step for installing the position detection sensors to the SR motor. In case any of the position detection sensors is out of order, the SR motor cannot be normally operated.

SUMMARY OF THE INVENTION

Accordingly, it is an object of the present invention to drive a switched reluctance (SR) motor by using a smaller number of position detection sensors than phases.

In order to achieve the above-described object of the present invention, there is provided a driving device for a switched reluctance (SR) motor, including: a position detection unit for detecting a position of a rotor of the SR motor by using one position detection sensor; and a microprocessor for aligning the rotor by sequentially outputting a plurality of control signals at an initial stage of a starting of the SR motor, and for sequentially outputting the plurality of control signals according to a result detected from the position detection unit after starting the SR motor.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
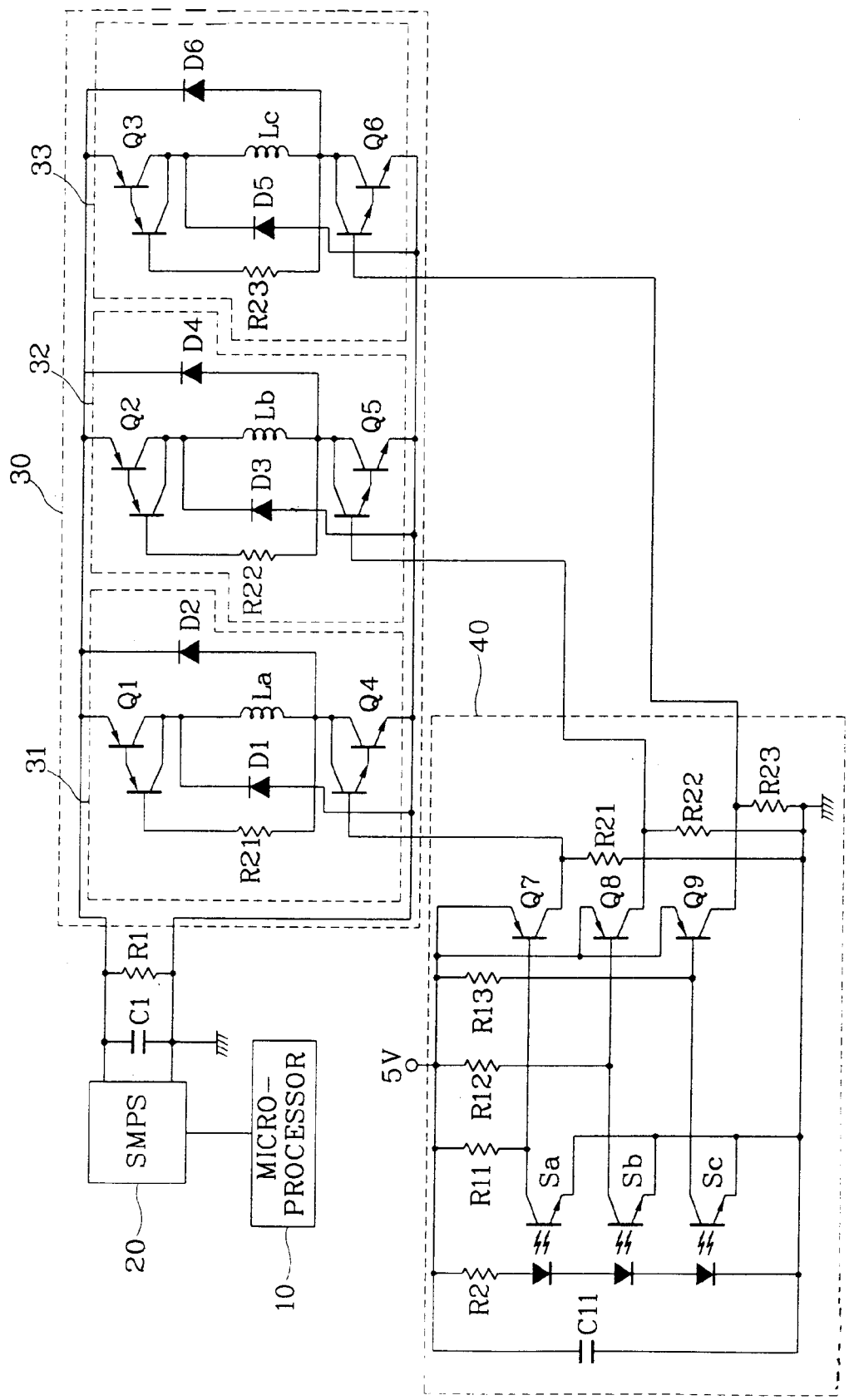
FIG. 1 is a circuit diagram illustrating a conventional driving device for an SR motor.
Figure 2:
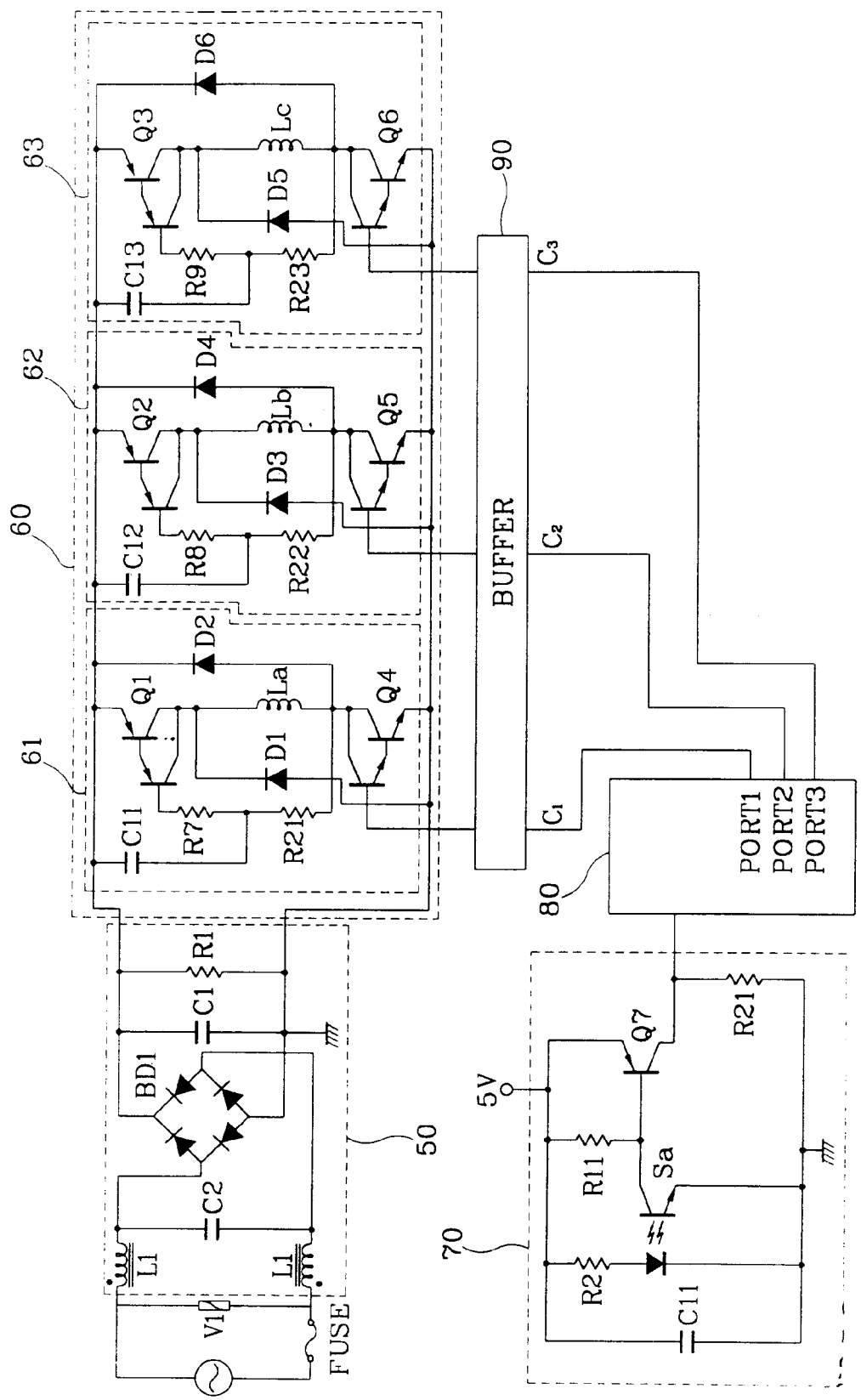
FIG. 2 is a circuit diagram illustrating a driving device for an SR motor in accordance with a first embodiment of the present invention.

FIG. 2 is a circuit diagram illustrating a driving device for a switched reluctance (SR) motor in accordance with a first embodiment of the present invention. As shown therein, the driving device for the SR motor includes: a rectification smoothing unit 50 outputting a direct current voltage by rectifying and smoothing an alternating current power source; a driving circuit 60 having six switching transistors Q1–Q6, and applying the rectified and smoothed direct current voltage to windings of each phase of the SR motor; a position detection unit 70 detecting a position of a rotor of the SR motor by using one position detection sensor Sa, and outputting a predetermined voltage (5V); a microprocessor 80 receiving the predetermined voltage (5V), and outputting control signals C1–C3 sequentially switching the six switching transistors Q1–Q6 of the driving circuit 60; and a buffer 90 converting levels of the control signals C1–C3, and applying the control signals C1–C3 to the three lower switching transistors Q4–Q6 among the six switching transistors Q1–Q6.

The rectification and smoothing unit 50 includes a common inductor L1, a capacitor C2, a bridge diode BD1, and a capacitor C1 and a resistance R1 which are connected in parallel to the bridge diode BD1. The driving circuit 60 includes first to third driving units 61, 62, 63. The first to third driving units 61, 62, 63 apply a current to an A phase winding La, a B phase winding Lb and a C phase winding Lc of a stator of the motor, respectively. The first driving unit 61 includes an upper switching transistor Q1, a lower switching transistor Q4, free wheeling diodes D1, D2, a plurality of resistances R7, R21 and a capacitor C11 for stable operation of the switching transistors Q1, Q4. A current path is formed by the two switching transistors Q1, Q4 and the A phase winding La. The second driving unit 62 and the third driving unit 63 are identical in constitution to the first driving unit 61. The position detection unit 70 includes a photo sensor Sa which is a position detection sensor for detecting the position of the rotor, and a switching transistor Q7 switched according to the operation of the photo sensor Sa, and outputting a predetermined voltage (5V) to the microprocessor 80.

The operation of the driving device for the SR motor in accordance with the first embodiment of the present invention will now be described.

The position detection unit of the conventional driving device for the SR motor uses three sensors, and thus it is possible to detect the position of the rotor, regardless of its position. However, since the driving device for the SR motor in accordance with the present invention utilizes one sensor, the position detection of the rotor is restricted, which influences on the starting of the SR motor. In a first embodiment of the present invention, at an initial stage of the starting of the motor, it is necessary to align the rotor at a predetermined position, namely a position where the position detection unit 70 can detect the position of the rotor. That is, a at the initial stage of the starting of the SR motor, a phase current is applied to a first phase, and thus the rotor is aligned at a position of the stator corresponding to the first phase. The phase current is applied to a second phase adjacent to the first phase, and thus the rotor is aligned at a position of the stator corresponding to the second phase. The phase current is applied to a third phase adjacent to the second phase, and thus the rotor is aligned at a position of the stator corresponding to the third phase. Accordingly, the alignment of the rotor is finished. The alignment operation will now be explained with reference to FIG. 3.

Figure 3:
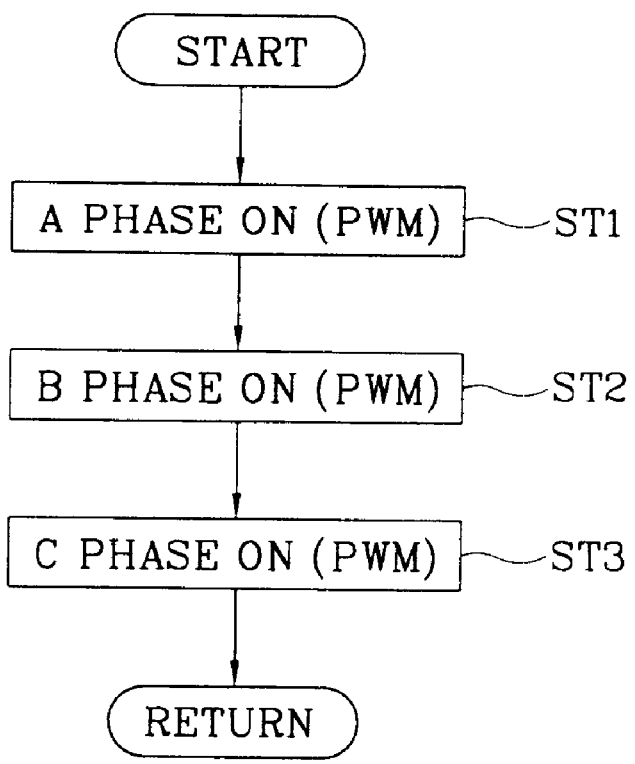
FIG. 3 is a flowchart showing an aligning operation at the starting of the SR motor in accordance with the first embodiment of the present invention.

FIG. 3 is a flowchart showing the aligning operation at the starting of the SR motor in accordance with the first embodiment of the present invention. In the step ST1, the microprocessor 80 outputs the first control signal C1. The level of the first control signal C1 is converted by the buffer 90. The first control signal C1 is applied to the lower switching transistor Q4 of the first driving unit 61, and thus the lower switching transistor Q4 and the upper switching transistor Q1 are turned on for a predetermined time. Accordingly, the direct current voltage rectified and smoothed by the rectification and smoothing unit 50 is applied to the A phase winding La of the rotor, thereby rotating the rotor by a predetermined angle. Here, the first control signal C1 is a pulse width modulation (hereinafter, referred to as 'PWM') signal. The ON time of the lower switching transistor Q4 by the first PWM control signal C1 is so long that a salient pole of the rotor can be pulled to a salient pole of the stator wound with the A phase winding.

Figure 8:
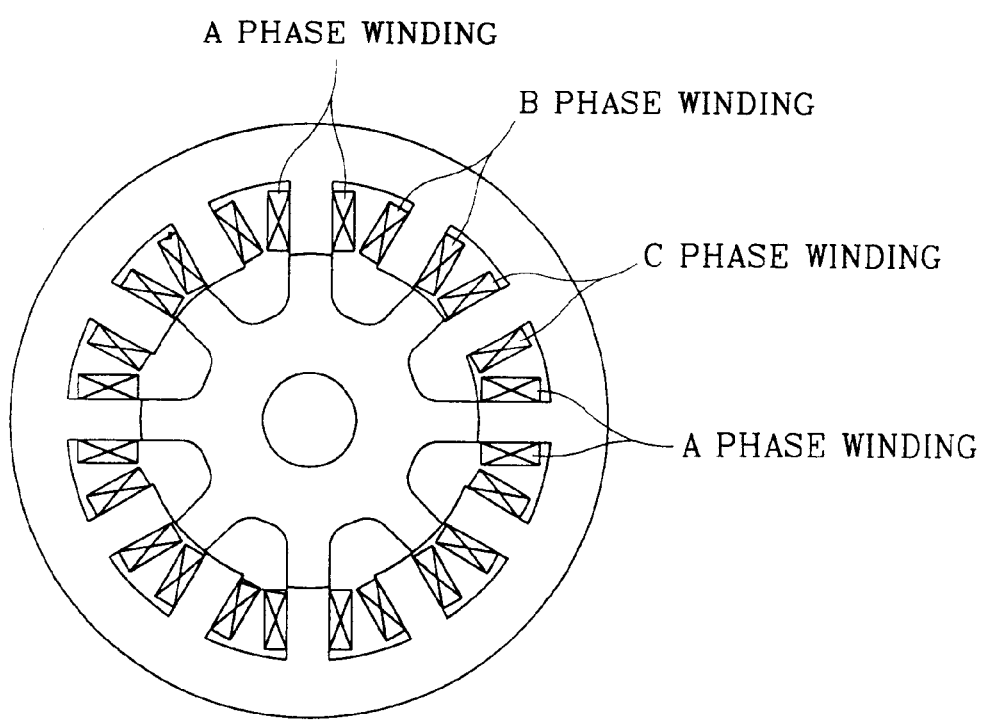
FIG. 8 is a cross-sectional diagram illustrating the SR motor for explanation of the operation in accordance with the present invention.

Thereafter, in the step ST2, the microprocessor 80 outputs the second PWM control signal C2, and thus the direct current voltage is applied to the B phase winding Lb of the rotor, thereby rotating the rotor by a predetermined angle. In the step ST3, the microprocessor 80 outputs the third PWM control signal C3, and thus the direct current voltage is applied to the C phase winding Lc of the rotor, thereby rotating the rotor by a predetermined angle. As a result, the rotor is moved to a position where the position detection unit 40 can detect its position. In the present invention, the direct current voltage is sequentially applied to the A phase winding, the B phase winding and the C phase winding. However, the order must be determined by considering a rotation direction during the normal rotation of the rotor after the starting of the SR motor. In case the SR motor has a structure of 12×8 as shown in FIG. 8, and in case the rotor is rotated in a counterclockwise direction after the starting of the motor, the direct current voltage must be sequentially applied to the A phase winding, the B phase winding and the C phase winding. Conversely, when the rotor is rotated in a clockwise direction, the direct current voltage must be applied sequentially to the C phase winding, the B phase winding and the A phase winding of the stator.

When the rotor of the SR motor is moved to the predetermined position, that is the alignment of the rotor is finished, the microprocessor 80 outputs the control signals C1, C2, C3 rotating the rotor of the SR motor, on the basis of a result detected from the position detection unit 70. This operation will now be explained.

When the sensor Sa of the position detection unit 70 is turned on, the switching transistor Q7 is turned on, and thus the predetermined voltage (5V) is inputted to the microprocessor 80. The microprocessor 80 sequentially outputs the control signals C1, C2, C3 in a previously-set order. The levels of the control signals C1, C2, C3 which are sequentially outputted are converted in the buffer. The control signals C1, C2, C3 are respectively applied to the lower switching transistor Q4 of the first driving unit 61 of the driving circuit 60, the lower switching transistor Q5 of the second driving unit 62, and the lower switching transistor Q6 of the third driving unit 63. On the other hand, the rotation direction of the rotor of the SR motor is determined in the output order of the control signals C1, C2, C3. Accordingly, when the predetermined voltage (5V) is inputted, the microprocessor 80 determines the output order of the control signals C1, C2, C3 by considering the current rotation direction of the SR motor.

The rotation speed of the rotor in accordance with the present invention is determined by the ON time of the lower switching transistors Q4, Q5, Q6 of the driving units 61, 62, 63. The ON time is determined by the control signals C1, C2, C3. Accordingly, the patterns of the control signals C1, C2, C3 corresponding to the rotation speed of the rotor are previously set in the microprocessor 80. When the predetermined voltage (5V) is applied from the position detection unit 70, the microprocessor 80 outputs the control signals C1, C2, C3 having the previously-set pattern in the predetermined order.

On the other hand, in the case that the positions of the rotor and the stator are peculiar—mostly not—, even though the alignment of the rotor is performed in accordance with the first embodiment of the present invention, the rotor may not be moved, and thus not aligned. For example, when the salient pole of the stator wound with the A phase winding is positioned at a center portion between two salient poles of the rotor, and when the direct current voltage is applied to the A phase winding, the rotor cannot be moved by the method according to the first embodiment of the present invention.

A second embodiment of the present invention suggests a method for aligning the rotor in the aforementioned case. In accordance with the second embodiment of the present invention, the alignment operation is performed for a shorter time (short alignment), as compared with the first embodiment, and the short alignment is carried out a few times, thus exactly performing the alignment, regardless of the position of the rotor. The operation will now be explained in detail with reference to FIG. 4.

Figure 4:
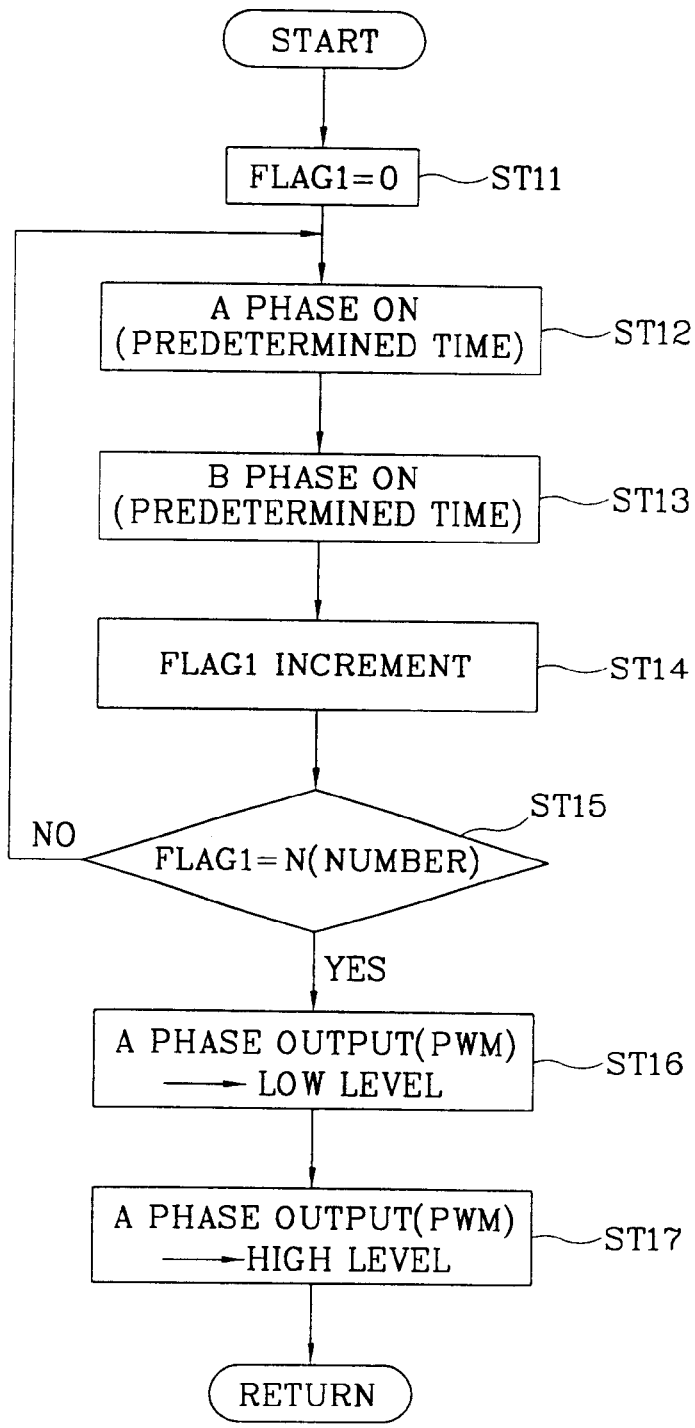
FIG. 4 is a flowchart showing an aligning operation at the starting of the SR motor in accordance with a second embodiment of the present invention.

FIG. 4 is a flowchart showing the aligning operation at the starting of the SR motor in accordance with the second embodiment of the present invention. The steps ST12, ST13 are steps for performing the short alignment, and the steps ST11, ST14, ST15 are steps for repeating the short alignment. After performing the steps ST11–ST15, the rotor is positioned at the position where the alignment can be carried out. In addition, the steps ST16, ST17 are steps for performing the normal alignment as suggested in the first embodiment.

The microprocessor 80 sets a flag value to be '0' in the step ST11, and outputs the first control signal C1 in the step ST12. Accordingly, the lower switching transistor Q4 of the first driving unit 61 is turned on, and thus the direct current voltage is applied to the A phase winding La of the rotor, thereby rotating the rotor by a predetermined angle. Here, the ON time of the lower switching transistor Q4 corresponding to the first control signal C1 is shorter than the ON time of the lower switching transistor Q4 corresponding to the first PWM control signal C1 according to the method of the first embodiment of the present invention, as shown in FIG. 3. That is, the ON time of the lower switching transistor Q4 by the first PWM control signal C1 is so long that the salient pole of the rotor can be pulled to the salient pole of the stator wound with the A phase winding. To the contrary, for the ON time of the lower switching transistor Q4 by the first control signal C1, the salient pole of the rotor can be merely slightly moved to the salient pole of the stator wound with the A phase winding. In the step ST13, the microprocessor 80 outputs the second control signal C2, and thus the lower switching transistor Q5 of the second driving unit 32 is turned on. The direct current voltage is applied to the B phase winding Lb of the rotor, thereby rotating the rotor by a predetermined angle. In the step ST14, the microprocessor 80 increases the flag value.

After repeatedly performing the steps ST12–ST13, the microprocessor 80 compares a previously-set flag value with a current flag value. The previously-set flag value corresponds to the number of performing the steps ST12–ST13.

When the condition of the step ST15 is satisfied, the microprocessor 80 outputs the first PWM control signal C1 at a low level in the step ST16, and outputs it at a high level after a predetermined time in the step ST17. Here, the first PWM control signal C1 is identical to the first PWM control signal C1 as mentioned in the first embodiment. As described above, the first PWM control signal C1 is applied, and thus the rotor is aligned at a specific position of the stator wound with the A phase winding.

In accordance with the second embodiment of the present invention, the short alignment is performed a few times, and thus the rotor is moved to a position where the rotor can be aligned. Accordingly, the rotor escapes from a position where the alignment cannot be performed. Thereafter, when the rotor reaches into the position where the alignment can be carried out, the alignment is performed.

Figure 5:
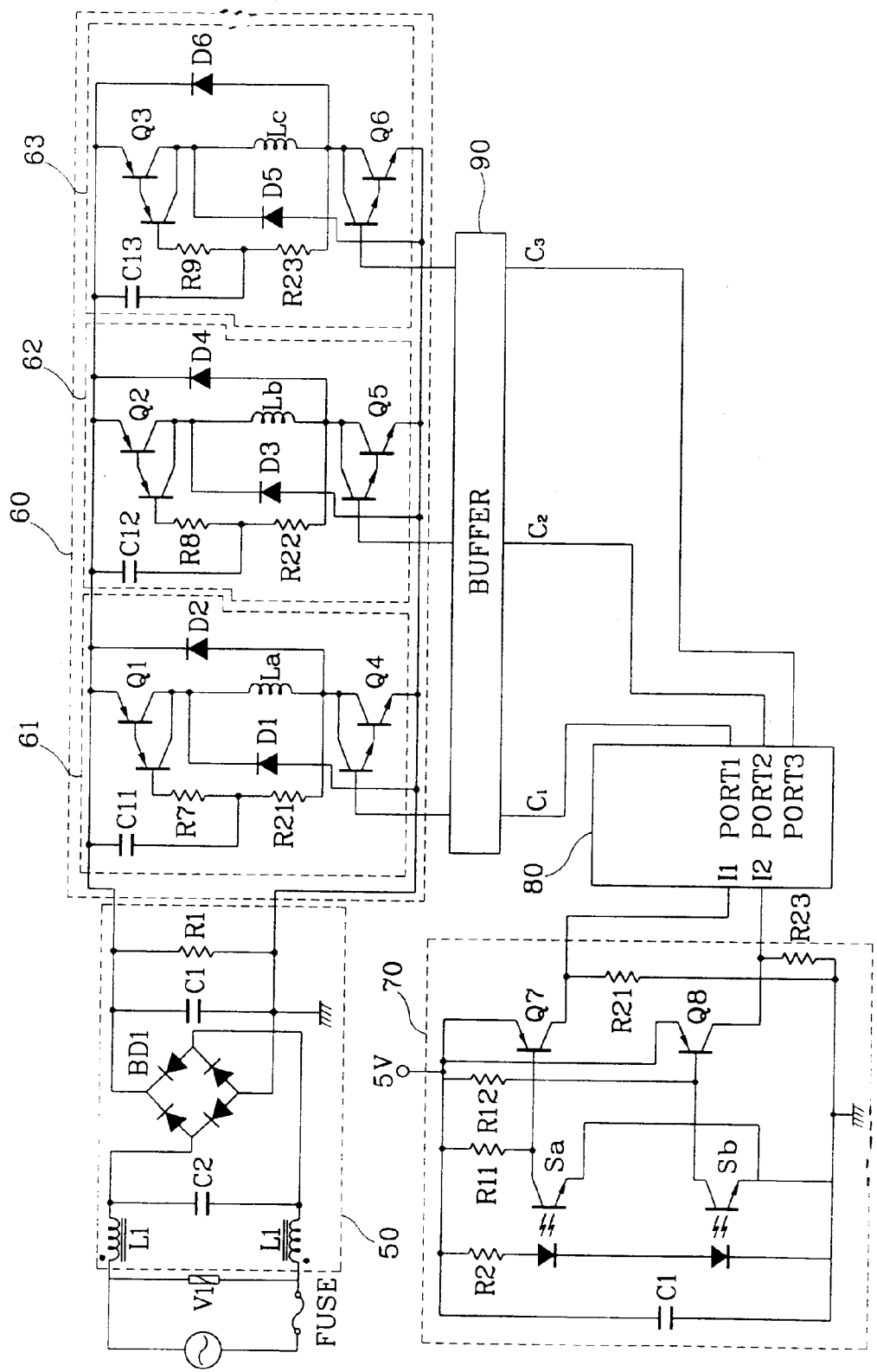
FIG. 5 is a circuit diagram illustrating a driving device for an SR motor in accordance with a third embodiment of the present invention.

A driving device for an SR motor in accordance with a third embodiment of the present invention will now be described. The position of the rotor is detected by using the two sensors, and the rotor is driven according to the detection result. FIG. 5 is a circuit diagram illustrating the driving device for the SR motor in accordance with the third embodiment of the present invention. As shown in FIG. 5, the position detection unit 70 includes two position detection sensors Sa, Sb, detects the position of the rotor of the SR motor by using the two position detection sensors Sa, Sb, and outputs the predetermined voltage (5V). The microprocessor 80 outputs the corresponding control signal according to the results detected from the two position detection sensors Sa, Sb, respectively. In case the detection result is not inputted from the position detection unit after a predetermined time, the microprocessor 80 judges a current position of the rotor by considering the rotation direction of the rotor, and outputs the resultant control signal.

Figure 6:
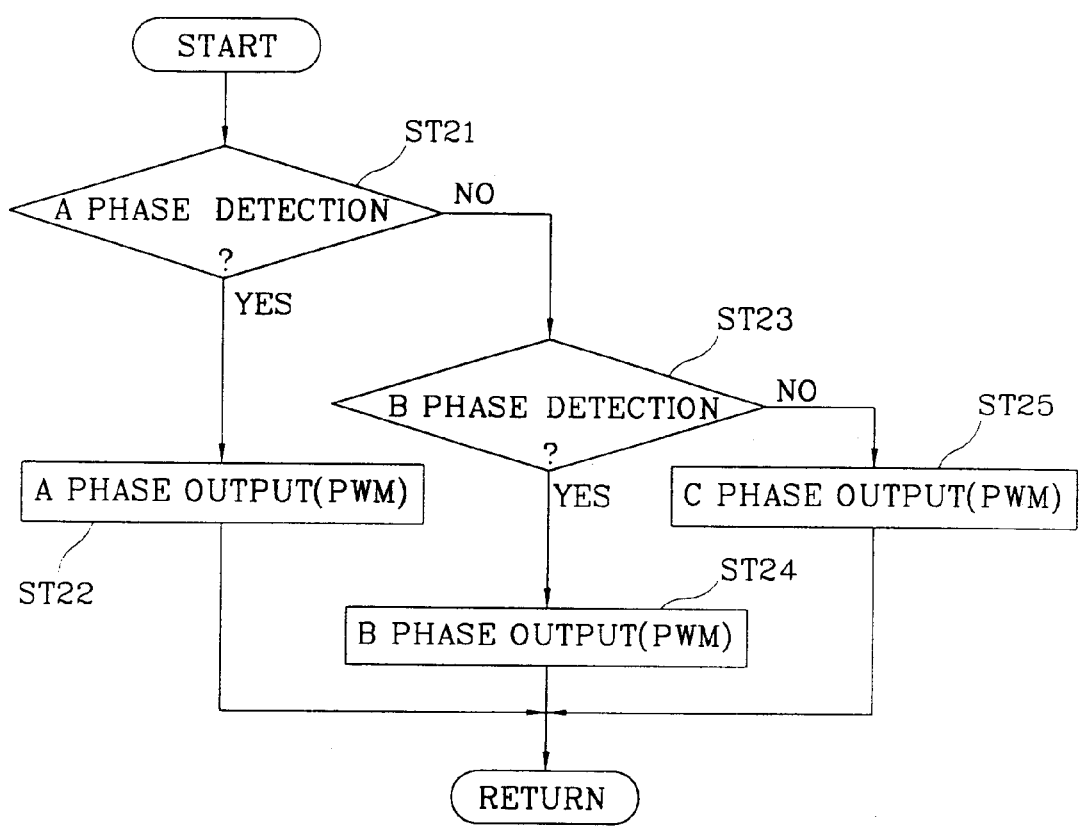
FIG. 6 is a flowchart showing a method for driving the SR motor in accordance with the third embodiment of the present invention.
Figure 7:
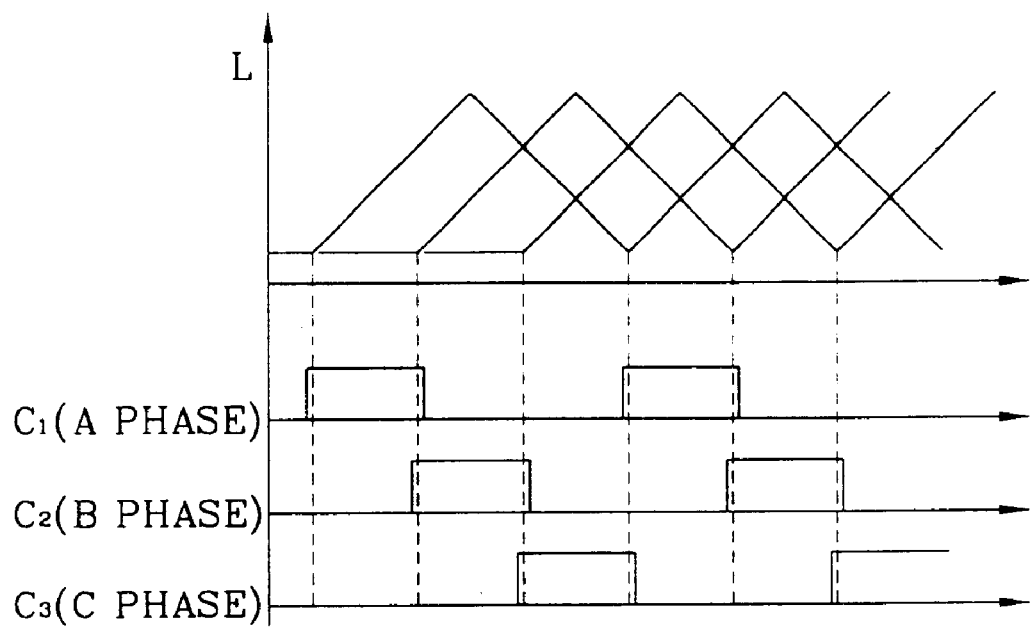
FIG. 7 is a waveform diagram of control signals outputted from a microprocessor in FIG. 5.

The detailed operation of the driving device for the SR motor according to the third embodiment of the present invention will now be explained with reference to FIGS. 6 and 7. FIG. 6 is a flowchart showing a method for driving the SR motor in accordance with the third embodiment of the present invention. FIG. 7 is a waveform diagram of the control signals outputted from the microprocessor in FIG. 5.

In the step ST21 as shown in FIG. 6, when the position of the rotor corresponding to the stator A phase is detected by the position detection sensor Sa of the position detection unit 70, the predetermined voltage (5V) is inputted to the microprocessor 80 through a terminal I1, and thus the microprocessor 80 outputs the first control signal C1 in the step ST22. That is, as illustrated in FIG. 7, when it is presumed that the position of the rotor is detected by the position detection sensor Sa at a point Ta where an inductance of the stator A phase starts to increase, the predetermined voltage 5V is inputted to the microprocessor 80 at the point Ta through the terminal I1. Then, the microprocessor 80 outputs the first control signal C1 at a high level.

In addition, when the position of the rotor corresponding to the stator B phase is detected by the position detection sensor Sb in the step ST23, the microprocessor 80 outputs the second control signal C2 through a terminal I2 in the step ST24. That is, when the predetermined voltage (5V) is inputted at the point Tb through the terminal I2, the microprocessor 80 outputs the second control signal C2.

In case the predetermined voltage (5V) is not inputted through the terminal I1 or I2 after the predetermined time, that is after the point Tc, the microprocessor 80 judges that the position of the rotor corresponds to the stator C phase, and outputs the third control signal C3 following the second control signal C2 in the step ST25.

As discussed earlier, in accordance with the present invention, the SR motor is exactly driven by using a smaller number of position detection sensors than the phases of the SR motor, thereby reducing a cost of the position detection sensors.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A driving device for a switched reluctance (SR) motor, comprising:
    a driving circuit including a plurality of switching transistors, and applying a direct current voltage to windings of each phase of a stator of the SR motor by switching the plurality of switching transistors;
    a position detection unit for detecting a position of a rotor of the SR motor by using one position detection sensor; and
    a microprocessor for aligning the rotor by sequentially outputting a plurality of control signals at an initial stage of the starting of the SR motor, and for sequentially outputting the plurality of control signals according to a result detected from the position detection unit after starting the SR motor, the plurality of switching transistors of the driving circuit being switched by the plurality of control signal;
    wherein the plurality of switching transistors are at an ON state for a sufficient time according to the control signals so that a salient pole of the rotor can be pulled to a salient pole of the stator.

2. The driving device according to claim 1, wherein the rotor is aligned at a position where it can be detected by the position detection unit.

3. The driving device according to claim 1, wherein the microprocessor sequentially outputs the control signals in consideration of the rotation direction of the rotor after starting the SR motor.

4. The driving device according to claim 1, wherein the microprocessor repeats the step for sequentially outputting the control signals a few times for a short time at the initial stage of the starting of the SR motor, thereby aligning the rotor.

5. A driving device for a switched reluctance (SR) motor, comprising:
    a driving circuit including a plurality of switching transistors, and applying a direct current voltage to windings of each phase of a stator of the SR motor by switching the plurality of switching transistors;
    a position detection unit for detecting a position of a rotor of the SR motor by using two position detection sensors; and
    a microprocessor for outputting a corresponding control signal according to a result detected from the two position detection sensors, and for judging a current position of the rotor in consideration of a rotation direction thereof and outputting a resultant control signal, when the detection result is not inputted from the position detection unit after a predetermined time, the plurality of switching transistors of the driving circuit being switched by the control signal;
    wherein the plurality of switching transistors are at an ON state for a sufficient time according to the control signals so that a salient pole of the rotor can be pulled to a salient pole of the stator.

6. A method for driving a switched reluctance (SR) motor, comprising:
    a step for a microprocessor to sequentially output a plurality of control signals at an initial stage of the starting of the SR motor;
    a step for aligning a rotor by switching a plurality of switching transistors of a driving circuit and applying a direct current voltage to windings of a stator according to the plurality of control signals;
    a step for the microprocessor to sequentially output the plurality of control signals according to a detection result, when a position of the rotor of the SR motor is detected by one position detection sensor, after the starting of the SR motor; and
    a step for normally rotating the rotor by switching the plurality of switching transistors of the driving circuit and applying the direct current voltage to the windings of the stator according to the plurality of control signal;
    wherein the plurality of switching transistors are at an ON state for a sufficient time according to the control signals so that a salient pole of the rotor can be pulled to a salient pole of the stator.

7. The method according to claim 6, wherein the rotor is aligned to a position where it can be detected by one position detection sensor.

8. The method according to claim 6, wherein the microprocessor sequentially outputs the control signals in consideration of the rotation direction of the rotor after starting the SR motor.

9. The method according to claim 6, wherein the microprocessor repeats the step for sequentially outputting the control signals a few times for a short time at the initial stage of the starting of the SR motor, thereby aligning the rotor.

* * * * *